Patented June 21, 1932

1,863,987

UNITED STATES PATENT OFFICE

MAX ALBERT KUNZ, OF MANNHEIM, AND KARL KOEBERLE AND ERICH BERTHOLD, OF LUDWIGSHAFEN-ON-THE-RHINE, GERMANY, ASSIGNORS TO GENERAL ANILINE WORKS INC., OF NEW YORK, N. Y., A CORPORATION OF DELAWARE

SUBSTITUTION PRODUCTS OF PYRANTHRONE

No Drawing. Application filed July 20, 1929, Serial No. 379,869, and in Germany July 28, 1928.

The present invention relates to the production of substitution products of pyranthrone from aminopyranthrones.

We have found that very valuable uniform derivatives of pyranthrone are obtained by diazotizing one or several amino groups of from mono- to tetraaminopyranthrones and replacing the diazo group or groups by halogen, hydroxy (free or etherified), cyano- thiocyano-, mercapto- or carboxylic acid group or groups. The amino compounds employed may for example be obtained by reduction of the nitropyranthrones prepared according to U. S. Patent No. 1,077,115. The carboxylic acid and mercapto derivatives of pyranthrone are obtained by saponification of the corresponding cyano and thiocyano derivatives.

The derivatives of pyranthrone thus obtained are in part dyestuffs themselves, for example the halogenpyranthrones, and in part valuable intermediate products for the preparation of new vat dyestuffs, in particular the pyranthrones substituted by oxygen containing radicles, that is to say the hydroxy and carboxylic acid derivatives which can be converted into new vat dyestuffs by etherification or esterification of the hydroxy and carboxylic acid groups respectively. The etherification may be effected by the action of dimethylsulphate, or the aliphatic or aromatic esters of p-toluenesulphonic acid, for example the methyl, ethyl, ethylene or chlorethylene, phenyl and like esters. The alkylated hydroxypyranthrones are particularly valuable as vat dyestuffs and from these the ethoxy and ω-chlorethoxyanthrones are the most important. Also the aroyl compounds of pyranthrones are vat dyestuffs and may be obtained by Friedel and Craft's method from the acid halides of the pyranthrone carboxylic acid obtainable as before described.

The following examples will further illustrate the nature of this invention, but the invention is not restricted to these examples. The parts are by weight.

Example 1

10 parts of the monoaminopyranthrone, obtainable according to U. S. Patent No. 1,077,115, are dissolved in sulphuric acid and diazotized in the usual manner with a solution of $N_2O_3$ in concentrated sulphuric acid (nitrose) or with a nitrite. The solution of diazosulphate obtained is heated while stirring at from 100° to 120° C. Nitrogen is evolved. The reaction is completed when the color of a test portion changes to green by the addition of alkali. After cooling the whole is poured on ice and the product is filtered off by suction and dried. The monohydroxy derivative corresponding to the formula

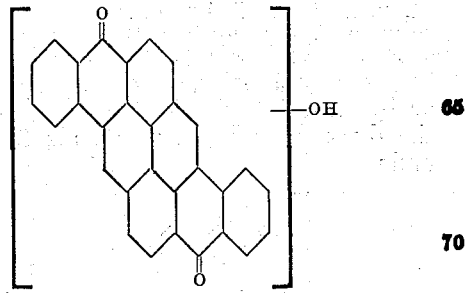

obtained as a red violet powder, dissolves in concentrated sulphuric acid to give a blue coloration, dissolves with difficulty in aqueous alkalies and dissolves in alcoholic alkalies to give a green coloration.

By treating the amino derivatives obtained from di- and tetranitropyranthrones in a similar manner, the di- and tetrahydroxy derivatives of pyranthrones are obtained.

Example 2

42 parts of the monohydroxy derivative described in the foregoing example in 30 to 50 times the quantity of trichlorbenzene are heated to boiling with 52 parts of methyl-p-toluenesulphonate and 45 parts of potassium carbonate until the formation of dyestuff is completed. After cooling, filtering off by suction and washing out the potassium carbonate the dyestuff corresponding to the formula

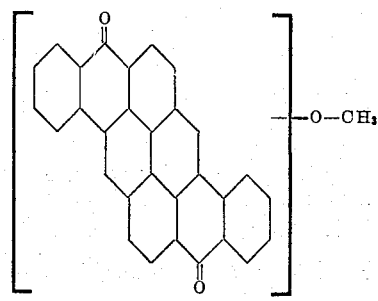

is obtained as a red brown crystalline powder. It dissolves in concentrated sulphuric acid to give a violet coloration and dyes cotton from a red violet vat in clear red brown shades having properties of extraordinary fastness. The dyestuff dissolves in organic solvents of high boiling point to give a brown red coloration with a yellow green fluorescence and crystallizes therefrom in brown red needles.

Example 3

42 parts of the monohydroxy derivative obtainable as described in Example 1 in 30 times the quantity of nitrobenzene together with 52 parts of ethyl-p-toluenesulphonate and 45 parts of potassium carbonate are heated to boiling. The formation of the dyestuff is indicated by the appearance of a yellow green fluorescence. The reaction is completed after about 3 hours. The further working up may be carried out either by filtering off the hot solution by suction in which case the dyestuff separates in a pure state by cooling the filtrate, or by filtering by suction after cooling or by steam distillation. The properties of the dyestuff which corresponds to the formula

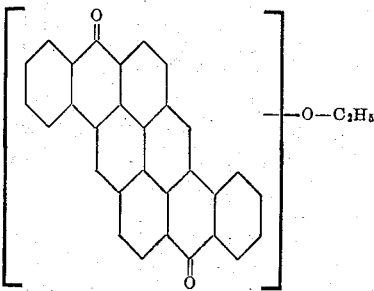

are very similar to those of the dyestuff described in Example 2.

By introducing by any known method another group, for example the ethylene group instead of the ethyl group, the corresponding ethers having similar dyeing properties to those described in the preceding example are obtained.

The ethers obtained in a similar manner from the polyhydroxy derivatives, generally speaking, give dyeings of deeper shades.

Example 4

42 parts of the monoamino derivative described in Example 1 are dissolved in concentrated sulphuric acid and diazotized in the usual manner. The diazosulphate obtained is converted into the corresponding monoiodo derivative, either directly, or after dilution, while stirring, with ice, by treatment with the calculated quantity of potassium iodide dissolved in water. The reaction is completed by stirring and heating up to 70° C. until the evolution of nitrogen has ceased. The product is then worked up in the usual manner. The monoiodo derivative thus obtained which corresponds to the formula

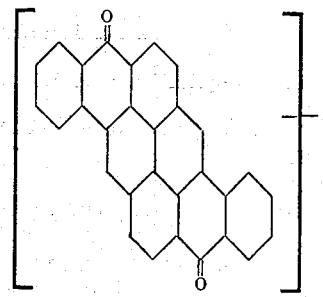

which is a brown powder, dissolves in concentrated sulphuric acid to give a blue solution and gives a red violet vat with alkaline hydrosulphite solution from which vegetable fibres are dyed in fast orange shades.

Other halogen derivatives, for example the chloro and bromo derivatives and also the thiocyano derivatives are obtained in a similar manner by employing cuprous chloride, cuprous bromide or potassium thiocyanate instead of potassium iodide, and, if desired by employing polyamino derivatives instead of the monoamino derivative.

Example 5

42 parts of monhydroxypyranthrone obtainable according to Example 1 are heated to boiling in 30 times the amount of nitrobenzene with 60 parts of the chlorethyl ester of p-toluenesulphonic acid and 45 parts of potassium carbonate for about 6 hours and filtered while hot. On cooling ω-chlorethoxy-pyranthrone corresponding to the formula

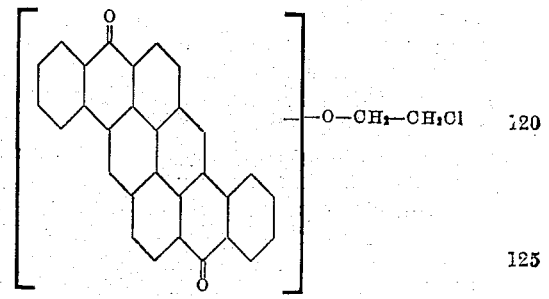

separates in red-brown crystals from the red-brown filtrate, it dissolves in concentrated sulphuric acid to give a red-blue coloration and dyes cotton from a violet vat brilliant red-brown shades of excellent fastness properties.

*Example 6*

42 parts of the monoaminopyranthrone obtainable as described in Example 1 are dissolved in 420 parts of concentrated sulphuric acid and diazotized in the usual manner. The solution of the diazo compound thus obtained is poured after dilution with about 800 parts of ice into a solution of cuprous cyanide, prepared by dissolving 75 parts of copper sulphate and 80 parts of potassium cyanide in 500 parts of water, whereby monocyanopyranthrone corresponding to the formula

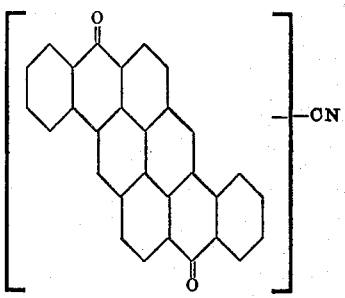

immediately separates in the form of brown flakes, nitrogen being evolved. The reaction product is filtered by suction and may be purified by recrystallization from solvents of high boiling point, such as for example nitrobenzene or trichlorobenzene, wherein the product is soluble with a brown coloration. It dissolves in concentrated sulphuric acid to give a blue coloration and dyes cotton from a violet vat strong yellow-brown shades.

What we claim is:

1. As new articles of manufacture alkylated monohydroxy pyranthrones.

2. As a new article of manufacture mono-ω-chlorethoxypyranthrone, dissolving in concentrated sulphuric acid to give a red blue coloration and dyeing cotton from a violet vat brilliant red-brown shades.

3. As a new article of manufacture monomethoxypyranthrone, dissolving in concentrated sulphuric acid to give a violet coloration and dyeing cotton from a red violet vat clear red brown shades.

4. As a new article of manufacture monoethoxypyranthrone, dissolving in concentrated sulphuric acid to give a violet coloration and dyeing cotton from a red violet vat clear red brown shades.

In testimony whereof we have hereunto set our hands.

MAX ALBERT KUNZ.
KARL KOEBERLE.
ERICH BERTHOLD.